United States Patent [19]

Nakajima et al.

[11] Patent Number: 4,475,739
[45] Date of Patent: Oct. 9, 1984

[54] PISTON RING ASSEMBLY FOR AUTOMOTIVE INTERNAL COMBUSTION ENGINE

[75] Inventors: Yasuo Nakajima, Yukosuka; Shinichi Nagumo, Yokohama; Yoshifumi Hase, Yokohama; Takaharu Gotoh, Yokohama, all of Japan

[73] Assignee: Nissan Motor Company, Limited, Yokohama, Japan

[21] Appl. No.: 490,022

[22] Filed: Apr. 29, 1983

[30] Foreign Application Priority Data

May 24, 1982 [JP] Japan .............................. 57-75802[U]

[51] Int. Cl.³ ............................................... F16J 9/22
[52] U.S. Cl. ...................................... 277/216; 277/193
[58] Field of Search ................. 277/216, 193, 195, 196

[56] References Cited

U.S. PATENT DOCUMENTS

| | | | |
|---|---|---|---|
| 3,098,659 | 7/1963 | Shepler | 277/193 |
| 4,206,930 | 6/1980 | Thrane | 277/216 |
| 4,280,708 | 7/1981 | Arai | 277/193 |
| 4,299,401 | 11/1981 | McCormick | 277/216 |

*Primary Examiner*—Robert I. Smith
*Attorney, Agent, or Firm*—Schwartz, Jeffery, Schwaab, Mack, Blumenthal & Koch

[57] ABSTRACT

Disclosed is a piston ring assembly for an automotive internal combustion engine, including a first compression ring having double-stepped mating ends for reducing the quantity of blow-by gas, and a second compression ring which is constructed in the form of a double-ring structure adapted for reducing the quantity of oil consumption.

5 Claims, 8 Drawing Figures

PISTON RING ASSEMBLY FOR AUTOMOTIVE INTERNAL COMBUSTION ENGINE

BACKGROUND OF THE INVENTION

1. Field of the Invention

This invention relates to a piston ring assembly for an automotive internal combustion engine.

2. Description of the Prior Art

Generally, in an automotive internal combustion engine, a piston, which constitutes part of a combustion chamber, performs the important functions of effecting intake, compression and exhaust, while at the same time transmitting an explosion force, which results from combustion of a fuel-air mixture in the combustion chamber, to a crank shaft through a connecting rod.

In order that the intake, compression and exhaust may be carried out under a satisfactory condition and the explosion energy may be effectively transmitted, it is required that a completely sealed space be defined by the piston and cylinder of the engine.

To meet the foregoing requirement, there has heretofore been proposed such an arrangement as shown in FIG. 1 of the accompanying drawings, wherein a first compression ring 2 and a second compression ring 3 are provided on the outer circumferential surface of the head portion of a piston 1 to thereby seal the sliding gap between the outer circumferential surface of the piston 1 and the inner surface 4 of the associated cylinder; and an oil ring 5 is also provided which is adapted to control formation of lubricating oil film on the cylinder inner surface 4 to thereby make smooth the movement of the first and second compression rings 2 and 3, while at the same time minimizing consumption of the lubricating oil. In FIG. 1, indicated at 6, 7 and 8 are grooves in which the piston rings 2, 3 and 5 are fitted respectively.

The inventors have recently made various experiments and investigations to enhance the sealing ability of a piston ring with a view to reducing the quantity of blow-by gas to thereby realize lower fuel consumption and prevent early degradation of lubricating oil. As a result, it has been confirmed that with an automotive internal combustion engine, it is possible to sufficiently reduce the quantity of blow-by gas by employing, as the aforementioned first compression ring 2, a piston ring 2 provided with double-stepped mating ends such as shown at 2A in FIGS. 2(A) and (B) which have conventionally been used with a large-type marine engine operating in a lower speed range than an automotive engine. (Refer to "Automotive Mechanics", pages 80 to 81, 1970, published by McGraw-Hill, Inc.)

As the pressure in the combustion chamber builds up through compression stroke into expansion stroke, the piston ring 2 having the double-stepped mating ends 2A is pressed against the lower surface of the ring groove 6, and under such a condition, a fuel-gas mixture or burnt gas, which has entered a space behind the ring 2 through the upper gap or upper mating end gap (a) of the ring 2, is prevented from leaking toward the lower mating end gap (b) thereof. Thus, the sealing ability of the ring 2 is further enhanced, so that the quantity of blow-by gas is reduced accordingly.

With the piston 1 using the first compression ring 2 having the double-stepped mating ends 2A, however, since the quantity of blow-by gas is reduced as mentioned above, it is not possible to prevent lubricating oil from ascending toward the combustion chamber with the aid of blow-by gas as in an arrangement wherein the first compression ring 2 is not provided with the double-stepped mating ends. Moreover, since the engine of interest is of a high speed type, the pressure occurring at the sliding gap between the first and second compression rings at expansion stroke of the engine, turns out much lower than in the case of the last-mentioned arrangement; thus, at the former half of the expansion stroke, the second compression ring 3 tends to flutter, instead of closely contacting the lower surface of the ring groove 7, when the engine is operating in the high-speed range with which an increased inertia force is imparted to the ring 3. For these reasons, there is the tendency that the quantity of oil consumption is increased especially when the engine is operating in the high-speed range, as will be seen from FIG. 3. In FIG. 3, the solid curve (A) indicates the engine speed-oil consumption characteristic for the case where the first compression ring 2 is provided with the double-spepped mating ends 2A, and the dashed curve (B) shows the engine speed - oil consumption characteristic for the case where the first compression ring 2 is not provided with the double-stepped mating ends.

SUMMARY OF THE INVENTION

Accordingly, it is an object of the present invention to provide a novel and improved piston ring assembly for an automotive internal combustion engine, which is so designed as to obviate the aforementioned drawbacks of the prior art.

Briefly stated, according to the present invention the above-described second compression ring of the piston is constructed in the form of a double-ring structure which comprises a front ring provided with an outer circumferential chamfered portion, the front ring being adapted to be disposed in sliding contact with the inner surface of a cylinder; and a rear ring provided with an outer circumferential chamfered portion which is adapted to be disposed, under tension, in contact with the inner circumferential chamfered portion of the front ring; the front and rear rings being adapted to be placed in close contact with the upper and lower surfaces of a ring groove formed in the piston, whereby the above-mentioned problems with the prior art are most effectively solved.

Other objects, features and advantages of the present invention will become apparent from the ensuing description taken in conjunction with the accompanying drawings.

DESCRIPTION OF THE PREFERRED EMBODIMENTS

Figure 4:
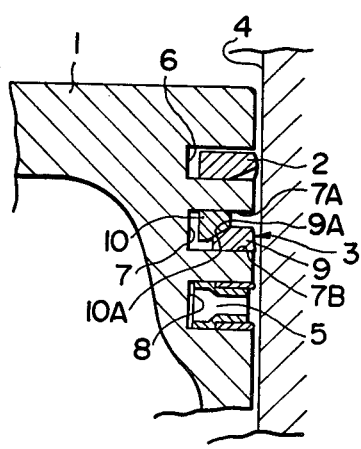
FIG. 4 is a fragmentary schematic sectional view showing the piston ring assembly for an automotive internal combustion engine according to a first embodiment of the present invention.

Referring to FIG. 4, there is shown the piston ring assembly for an automotive internal combustion engine according to a first embodiment of the present invention, wherein a first compression ring 2, a second compression ring 3 and an oil ring 5 are fitted, in the named order as viewed from the combustion chamber of the engine, on the outer circumferential surface of the head portion of a piston 1 adapted to reciprocate, upwardly and downwardly as viewed in the drawing, while being placed in contact with a cylinder inner surface 4.

Figure 2A:
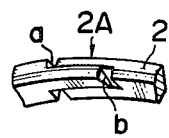
FIGS. 2(A) and (B) are fragmentary perspective views each showing a piston ring provided with double-stepped mating ends.
Figure 2B:
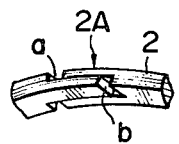

The first compression ring 2 is constructed in the form of a piston ring provided with double-stepped mating ends 2A such as shown in FIGS. 2(A) and (B).

The second compression ring 3 is constructed in the form of a double-ring structure which comprises a front ring 9 having an inner circumferential chamfered portion 9A, the front ring 9 being adapted to be disposed in sliding contact with the cylinder inner surface 4; and a rear ring 10 provided with an outer circumferential chamfered portion 10A which is adapted to be disposed, under tension, in contact with the chamfered portion 9A of the front ring 9. The front and rear rings 9 and 10 are adapted to be placed in close contact with upper and lower surfaces 7A and 7B of a ring groove 7 formed in the circumferential surface of the head portion of the piston 1, respectively, under the influence of the tension of the rear ring 10.

Figure 5:
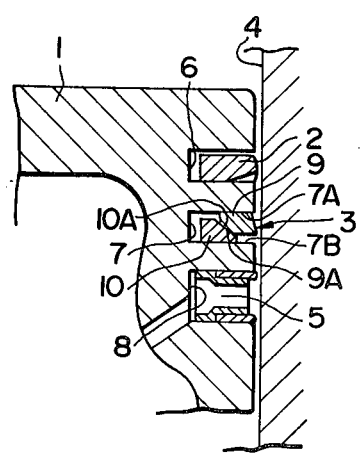
FIG. 5 is a view, similar to FIG. 4, showing the piston ring assembly for an automotive internal combustion engine according to a second embodiment of the present invention.

Although, in this embodiment, the configuration of the chamfered portions 9A and 10A is selected such that the front ring 9 is placed in close contact with the lower surface 7B of the ring groove 7 while the rear ring 10 is disposed in close contact with the upper surface 7A of the ring groove 7 as mentioned above, it is also possible that such configuration may be chosen such that the front ring 9 contacts the upper surface 7A while the rear ring 10 contacts the lower surface 7B as shown in FIG. 5.

Figure 1:
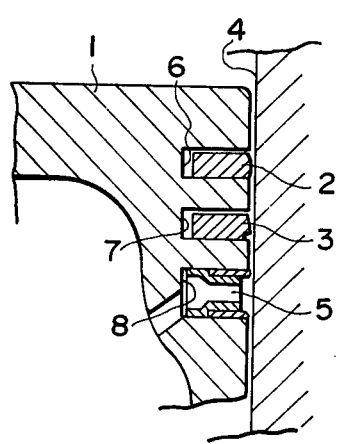
FIG. 1, is a fragmentary schematic sectional view showing the prior-art piston ring assembly for an automotive internal combustion engine.

The remainder of the construction shown in FIG. 4 is similar to that of FIG. 1; therefore, parts corresponding to those of FIG. 1 are indicated by like reference numerals, and no further explanation thereof will be made.

With the aforementioned construction of the present invention, the rear ring 10 possesses a force (tension) pushing the front ring 9 toward the cylinder inner surface 4, and thus when the front ring 9 is placed in contact with the cylinder inner surface 4 under the influence of the force (tension) of the rear ring 10, components of the force in the upward and downward directions of the piston act on the front and rear rings 9 and 10 respectively so that these rings 9 and 10 are strongly pressed against the lower and upper surfaces 7B and 7A of the ring groove 7 respectively.

Thus, the front ring 9 serving as the second compression ring 3 is prevented from fluttering in the ring groove 7 and maintained in close contact with the lower surface 7B of the ring groove 7, despite the fact that the quantity of blow-by gas passing by the first compression ring 2 at each expansion stroke of the engine, is decreased because of the ring 2 being provided with the double-stepped mating ends 2A. Consequently, the pressure at the sliding gap between the first and second compression rings 2 and 3 is further reduced.

As will be appreciated, such a condition is also maintained for each intake stroke of the engine with which a vacuum pressure is established in the combustion chamber and a strong upward inertia force is imparted to the second compression ring 3 when the engine is operated in the high-speed range.

In this way, according to the present invention, the second compression ring 3 is prevented from fluttering, and thus lubricating oil pumping effect is avoided so that the quantity of oil consumption is remarkably reduced.

Referring to FIG. 5, there is shown the piston ring assembly for an automotive internal combustion engine according to a second embodiment of the present invention, which is designed such that the front ring 9 is placed in close contact with the upper surface 7A of the ring groove 7. As will be appreciated, this embodiment is more efficient in that even when the pressure at the sliding gap above the second compression ring 3 is increased because of a certain quantity of blow-by gas passing by the first compression ring 2, the blow-by gas pressure acts, from the space behind the rings 9 and 10, to bring these rings 9 and 10 into close contact with the upper and lower surfaces 7A and 7B of the ring groove 7 respectively.

In each of the foregoing embodiments, it is possible to further reduce the quantity of oil cunsumption by plating relatively soft metal such as copper or the like on one or both of the chamfered portions 9A and 10A which are disposed in contact with each other.

Incidentally, a piston ring assembly of the type that two rings are provided in a single groove as in the present invention, was alreadly employed with an aircraft engine more than thirty years ago. (Refer to CARL ENGLISCH: "KOLBEN RINGE", 1958, published by Wien-Springel.) Obviously, however, this prior-art assembly is different from that of the present invention in that the same was intended to be used with an aircraft engine operating in an approximately constant high-speed range and for different purposes. According to the present invention, as mentioned above, the quantity of blow-by gas is reduced by virtue of the first compression ring 2 having the double-stepped mating ends 2A; if such compression ring were not used, then the blow-by gas pressure would act on the rear ring 10 to cancel the force pressing the front ring 9 against the cylinder inner surface 4 so that no force would be available for keeping the rings 9 and 10 in close contact with the upper and lower surfaces 7A and 7B of the ring groove 7 respectively. As will be appreciated from this, the second compression ring 3 employed in the present invention works only when the piston 1 uses the first compression ring 2 having the double-stepped mating ends 2A. As a result of experiments conducted by the inventors, it has been found that with a piston ring assembly wherein the first compression ring 2 has ordinary mating ends and the second compression ring 3 has double-stepped mating ends, the quantity of oil consumption increases when the engine is operated in the high-speed range, as shown in FIG. 6.

Figure 3:
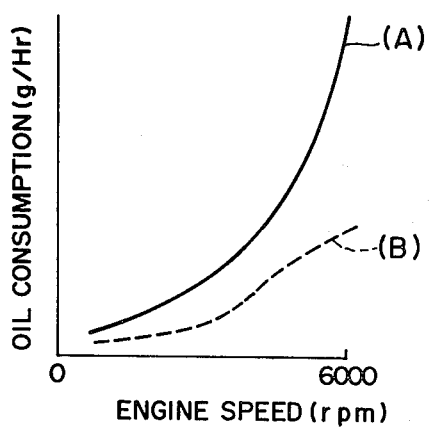
FIG. 3 is a comparative view showing engine speed - oil consumption characteristics.

Furthermore, it has also been found that with a piston ring assembly wherein the second compression ring 3 has ordinary mating ends and the first compression ring 2 has double-stepped mating ends 2A, the quantity of oil consumption increases as shown in FIG. 3. With a piston ring assembly wherein the first compression ring 2 has ordinary mating ends and only the second compression ring 3 has double-stepped mating ends, as mentioned above, the quantity of oil consumption increases when the engine is operated in the high-speed range. Thus, according to the present invention, the foregoing two types of assembly are combined to thereby reduce the quantity of blow-by gas without increasing the quantity of oil consumption.

Figure 6:
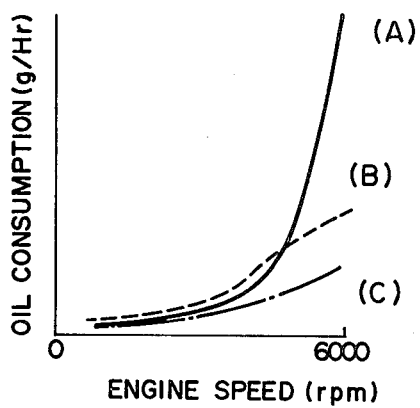
FIGS. 6 and 7 are comparative views showing oil consumption and blow-by gas flow rate characteristics, respectively.
Figure 7:
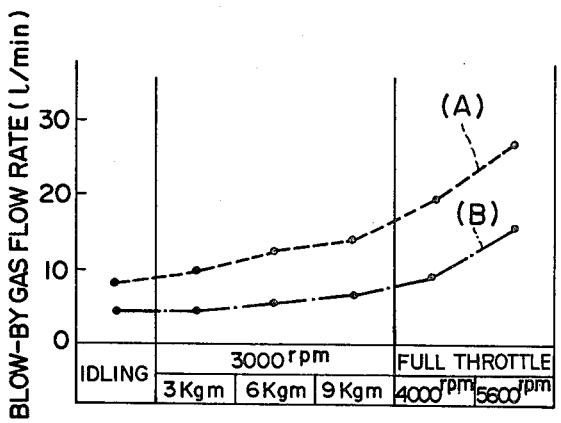

Referring to FIGS. 6 and 7, there are shown engine speed - oil consumption characteristics and engine speed - blow-by gas flow rate characteristics, respectively. In FIG. 6, the curve (A) is for the case where only the second compression ring was constructed according to the present invention; the curve (B) is for the case where neither of the first and second compression rings was constructed according to the present invention; and the curve (C) is for the case where both of the first and second compression rings were constructed in accordance with the present invention. In FIG. 7, the curve (A) is for the case of the prior-art assembly; and the curve (B) is for the case of the assembly embodying the present invention the engine speed - oil consumption characteristic of which is as shown by the curve (C) in FIG. 6. As will be seen from these figures, according to the present invention, it is possible to reduce the quantity of blow-by gas without increasing the quantity of oil consumption.

As will be appreciated from the foregoing discussion, according to an aspect of the present invention, there is provided a piston ring assembly for an automotive internal combustion engine, which includes a first compression ring having double-stepped mating ends, and a second compression ring constructed in the form of a double-ring structure which comprises a front ring provided with an inner circumferential chamfered portion, the front ring being adapted to be disposed in sliding contact with a cylinder inner surface; and a rear ring provided with an outer circumferential chamfered portion adapted to be disposed, under tension, in contact with the inner circumferential chamfered portion of the front ring. With such an arrangement, under the influence of the tension of the rear ring, the front and rear rings are placed in close contact with the upper and lower surfaces of a ring groove in which these rings are disposed, respectively, so that the second ring is most effectively prevented from fluttering, thus reducing the quantity of blow-by gas as well as the quantity of oil consumption.

While the present invention has been described and illustrated with respect to specific embodiments thereof, it is to be understood that the present invention is by no means limited thereto but covers all changes and modifications which will become possible within the scope of the appended claims.

What is claimed is:

1. A piston ring assembly for an automotive internal combustion engine, comprising:

a first compression ring disposed in a first groove formed in the outer circumferential surface of the head portion of the piston reciprocating in sliding contact with a cylinder inner surface, said first compression ring being provided with double-stepped mating ends; and a second compression ring disposed in a second groove formed in said outer circumferential surface at a position spaced apart from said first groove in the direction opposite to the combustion chamber of said engine, said second compression ring being constructed in the form of a double-ring structure which comprises:

a front ring provided with an inner circumferential chamfered portion, said front ring being adapted to be disposed in sliding contact with said cylinder inner surface; and a rear ring provided with an outer circumferential chamfered portion adapted to be disposed, under tension, in contact with said inner circumferential chamfered portion of said front ring; and said double-ring structure being positioned in close contact with the lower and upper surfaces of said second groove, under the influence of the tension of said rear ring. in contact with said inner circumferential chamfered portion of said front ring.

2. A piston ring assembly according to claim 1, wherein the configuration of said inner and outer circumferential chamfered portions is selected such that said front and rear rings are disposed in close contact with the lower and upper surface of said second groove, respectively, under the influence of the tension of said rear ring.

3. A piston ring assembly according to claim 1, wherein the configuration of said inner and outer circumferential chambered portions is selected such that said front and rear rings are disposed in close contact with the upper and lower surfaces of said second groove, respectively, under the influence of the tension of said rear ring.

4. A piston ring assembly according to claim 1, wherein at least one of said inner and outer circumferential chamfered portions is plated with soft metal.

5. A piston ring assembly according to claim 4, wherein said soft metal is copper.

* * * * *